United States Patent
Okada

(10) Patent No.: US 9,924,425 B2
(45) Date of Patent: Mar. 20, 2018

(54) WIRELESS COMMUNICATIONS SYSTEM AND WIRELESS COMMUNICATION DEVICE

(71) Applicant: Panasonic Corporation, Osaka (JP)

(72) Inventor: Eiji Okada, Osaka (JP)

(73) Assignee: PANASONIC CORPORATION, Osaka (JP)

(*) Notice: Subject to any disclaimer, the term of this patent is extended or adjusted under 35 U.S.C. 154(b) by 149 days.

(21) Appl. No.: 14/956,345

(22) Filed: Dec. 1, 2015

(65) Prior Publication Data

US 2016/0183150 A1 Jun. 23, 2016

(30) Foreign Application Priority Data

Dec. 22, 2014 (JP) .................................. 2014-259289

(51) Int. Cl.
*H04W 4/00* (2009.01)
*H04L 12/26* (2006.01)
*H04W 36/06* (2009.01)
*H04W 72/02* (2009.01)
*H04W 36/22* (2009.01)

(52) U.S. Cl.
CPC .......... *H04W 36/06* (2013.01); *H04W 72/02* (2013.01); *H04W 36/22* (2013.01)

(58) Field of Classification Search
CPC ...... H04W 36/06; H04W 72/02; H04W 36/22
See application file for complete search history.

(56) References Cited

U.S. PATENT DOCUMENTS

| 8,650,281 B1* | 2/2014 | Toley | H04L 41/0213 370/235 |
| 2014/0192777 A1* | 7/2014 | Seok | H04W 36/06 370/331 |

FOREIGN PATENT DOCUMENTS

| JP | 2003-259434 | 9/2003 |
| JP | 2013-085099 | 5/2013 |
| JP | 2014-068134 | 4/2014 |

* cited by examiner

*Primary Examiner* — Kiet Tang
(74) *Attorney, Agent, or Firm* — McDermott Will & Emery LLP

(57) ABSTRACT

A first wireless communication device includes first wireless communication circuitry that selectively operates in one of a plurality of bands and first control circuitry that sets a band in which the first wireless communication circuitry operates. The first control circuitry switches bands such that the first wireless communication circuitry operates in all of the plurality of bands within a certain cycle time. A second wireless communication device includes second wireless communication circuitry that selectively operates in one of the plurality of bands and second control circuitry that sets a band in which the second wireless communication circuitry operates. The second control circuitry switches to a different band when the second wireless communication device has been unable to communicate with the first wireless communication device.

20 Claims, 12 Drawing Sheets

FIG. 2
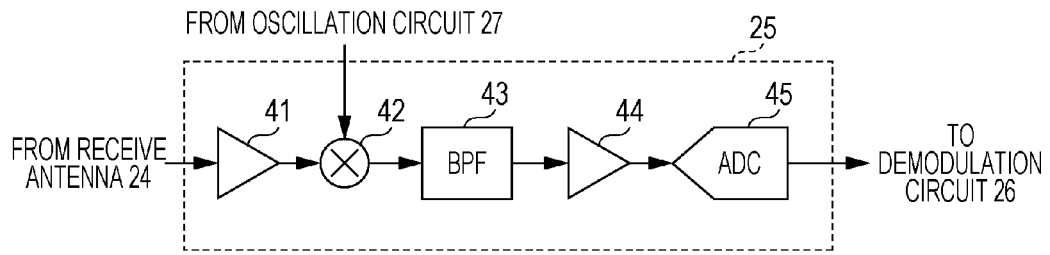
FIG. 3
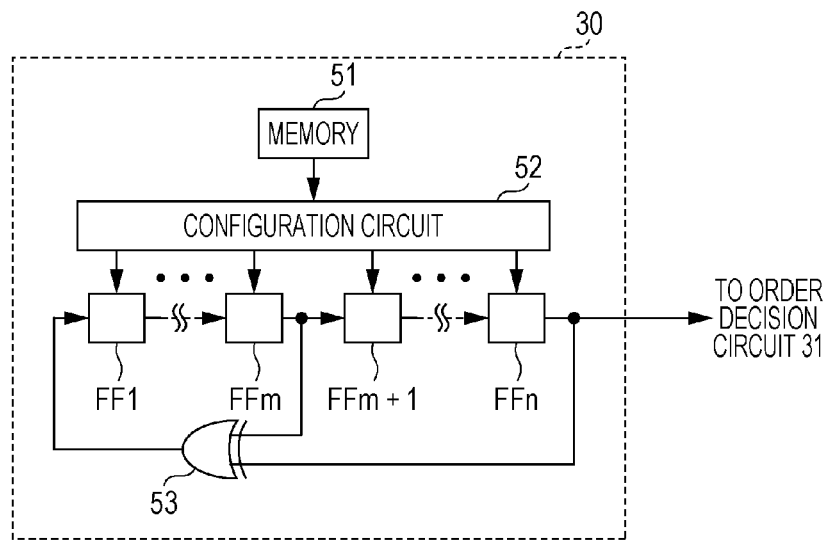
FIG. 4
| ORDER | BAND | THRESHOLD | OPERABLE DISTANCE |
|---|---|---|---|
| 4 | A | −95 dBm | d1 |
| 2 | B | −90 dBm | d2 |
| 1 | C | −100 dBm | d3 |
| 3 | D | −95 dBm | d4 |
| 5 | E | −110 dBm | d5 |

WIRELESS COMMUNICATIONS SYSTEM AND WIRELESS COMMUNICATION DEVICE

BACKGROUND

1. Technical Field

The present disclosure relates to wireless communication devices and a wireless communications system including multiple wireless communication devices, and more particularly to a wireless communications system that uses multiple frequency bands (or just bands).

2. Description of the Related Art

In an unlicensed band such as 2.4-GHz band, for example, wireless communication devices can perform communication without the necessity to acquire a license. However, there is concern that increase in wireless communication devices that use unlicensed bands, such as sensor wireless systems, leads to an increase in the amount of traffic in those bands to the point of hindering communication. A method has been proposed in which wireless communication devices capable of communication on multiple channels are used and the channel being used is switched in the event of degradation in communication conditions. This method is effective when frequency allocation within bands is fixed such as in licensed bands; however, as diverse communication schemes are used in unlicensed bands and also devices other than wireless communication devices are present, switching of channels is not sufficient in some cases. Additionally, in a wireless communications system including a single host unit and multiple remote units, information on the destination channel is sent from the host unit to remote units. Accordingly, as the number of remote units increases, the burden on the host unit becomes high and the amount of traffic is increased.

Wireless communications systems are known that selectively use one of multiple bands in a wireless environment in which multiple wireless communication devices perform multiple wireless communication sessions concurrently. Systems of this type are disclosed in Japanese Unexamined Patent Application Publication Nos. 2013-085099, 2014-068134, and 2003-259434, for example.

The technique disclosed by Japanese Unexamined Patent Application Publication No. 2013-085099 enables effective changeover of the band being used in wireless communication among multiple wireless devices to another band in, for example, a smart utility network (SUN). This technique achieves dynamic switching of bands with a small amount of traffic by exchanging band switch requests, responses, and schedule information among wireless devices and switching the band based on the schedule information.

The technique disclosed by Japanese Unexamined Patent Application Publication No. 2014-068134 prevents a long interruption of communication when the frequency band being used for communication is automatically changed in, for example, a wireless LAN. According to the technique, a band switch request is sent from a remote unit to the host unit, which then switches the band based on a calculated time. Since this technique switches the band upon elapse of a certain time period after reception of a band switch request, communication is not interrupted for a long time at the time of band switching and no wasted time occurs.

The technique disclosed by Japanese Unexamined Patent Application Publication No. 2003-259434 selects a frequency band for communication that meets conditions from multiple frequency bands in, for example, mobile communication. In the technique, the availability of bands and the conditions of transmission channels are detected and bands are switched based on them. This technique enables selection of a better band as it employs channel conditions in addition to band availability.

SUMMARY

One non-limiting and exemplary embodiment provides a wireless communications system that can reduce interruptions of communication caused by an increase in traffic, improve the efficiency of use of multiple bands, and prevent increase in extra processing and extra traffic involved in band switching.

In one general aspect, the techniques disclosed here feature a wireless communications system including a first wireless communication device and at least one second wireless communication device. The first wireless communication device includes first wireless communication circuitry that selectively operates in one of a plurality of bands, and first control circuitry that sets a band in which the first wireless communication circuitry operates. The first control circuitry switches the band in which the first wireless communication circuitry operates such that the first wireless communication circuitry operates in all of the plurality of bands within a predetermined cycle time. The at least one second wireless communication device each includes second wireless communication circuitry that selectively operates in one of the plurality of bands, and second control circuitry that sets a band in which the second wireless communication circuitry operates. In each of the at least one second wireless communication device, the second control circuitry switches the band in which the second wireless communication circuitry operates to a different band when the second wireless communication device has been unable to communicate with the first wireless communication device for a time equal to or longer than the cycle time.

The wireless communications system according to an aspect of the present disclosure can reduce interruptions of communication caused by an increase in traffic, improve the efficiency of use of multiple bands, and prevent increase in extra processing and extra traffic involved in band switching. It should be noted that general or specific embodiments may be implemented as a device, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a block diagram illustrating the configuration of a wireless reception circuit 25 in FIG. 1;

FIG. 3 is a block diagram illustrating the configuration of a random number generator 30 in FIG. 1;

FIG. 4 is a table showing the contents of a band table memory 32 in FIG. 1;

DETAILED DESCRIPTION

Figure 1:
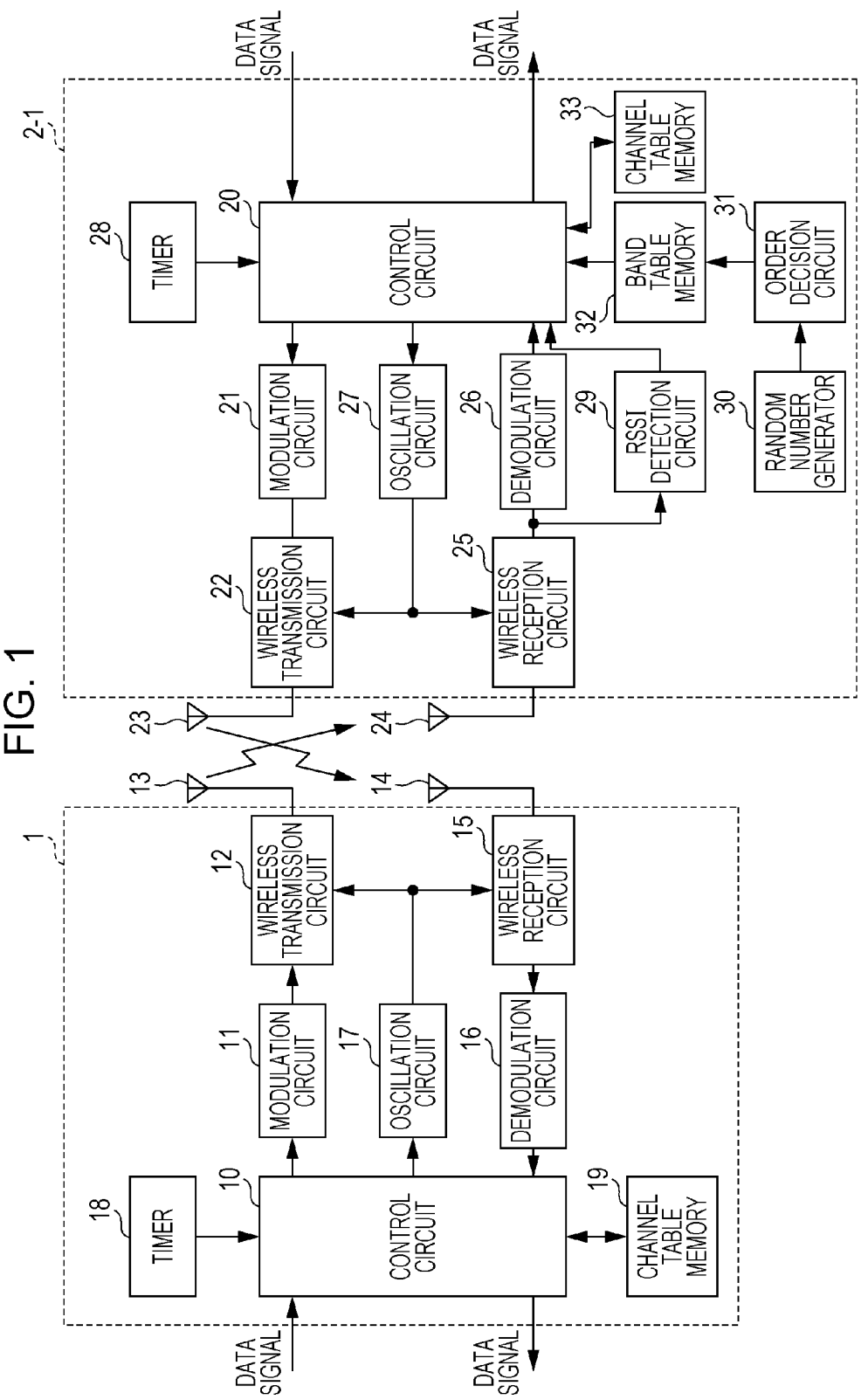
FIG. 1 is a block diagram illustrating the configuration of the wireless communications system according to a first embodiment of the present disclosure.

Underlying Knowledge Forming Basis of the Present Disclosure

The techniques disclosed by Japanese Unexamined Patent Application Publication Nos. 2013-085099 and 2014-068134 require transmission and reception of a band switch request and other signals between wireless communication devices for selection of a band, so communication has to be performed on a band beforehand. Thus, the techniques cannot be employed for selecting a band at the start of communication so as to prevent interruptions of communication caused by an increase in traffic at the start of communication. In addition, Japanese Unexamined Patent Application Publication Nos. 2013-085099 and 2014-068134 only disclose scenarios that use two bands and do not disclose scenarios that use three or more bands.

The technique disclosed by Japanese Unexamined Patent Application Publication No. 2003-259434 incurs increase in circuit scale, power consumption, and traffic because it involves detection of band availability and transmission channel conditions. Further, none of Japanese Unexamined Patent Application Publication Nos. 2013-085099, 2014-068134, and 2003-259434 discloses even and efficient use of multiple bands.

The inventor has therefore conducted studies to provide a wireless communications system in which multiple bands are shared by multiple wireless communication sessions concurrently performed among multiple wireless communication devices and which can prevent interruptions of communication caused by an increase in traffic, use multiple bands evenly and efficiently, and prevent increase in extra processing and extra traffic involved in band switching.

Embodiments of the present disclosure will be described below in detail with reference to the drawings. The same or similar elements are denoted with the same reference characters and description of such elements may not be repeated.

First Embodiment

In the first embodiment, a single host unit equipped with a wireless communication device performs wireless communication with at least one remote unit each equipped with a wireless communication device. The host unit may be a controller for monitoring cameras, for example, and the remote units may be monitoring cameras, for example. FIG. 1 is a block diagram illustrating the configuration of the wireless communications system according to the first embodiment. The wireless communications system includes a wireless communication device 1 of a single host unit, and a wireless communication device 2-1 of at least one remote unit. The wireless communication device 1 is an example of a first wireless communication device, and the wireless communication device 2-1 is an example of a second wireless communication device. The following description supposes that N remote units are present, where N is an integer equal to or greater than 2. The wireless communication devices 2-2 to 2-N of remote units have the same or a similar configuration to that of the wireless communication device 2-1. The wireless communication device 1 of the host unit and the wireless communication devices of remote units (such as the wireless communication device 2-1) each selectively operate in one of the same set of predetermined bands (for example, 400 MHz, 900 MHz, 2.4 GHz).

The wireless communication device 1 includes a control circuit 10, a modulation circuit 11, a wireless transmission circuit 12, a transmit antenna 13, a receive antenna 14, a wireless reception circuit 15, a demodulation circuit 16, an oscillation circuit 17, a timer 18, and a channel table memory 19. The control circuit 10 is an example of first control circuitry. The control circuit 10 inputs a data signal from an external circuit, and transmits the input data signal via the modulation circuit 11, the wireless transmission circuit 12, and the transmit antenna 13. The control circuit 10 receives a data signal via the receive antenna 14, the wireless reception circuit 15, and the demodulation circuit 16, and outputs the received data signal to the external circuit. The external circuit is a circuit included in the host unit for controlling monitoring cameras, for example.

The oscillation circuit 17, under control of the control circuit 10, supplies a carrier wave signal of a variable frequency to the wireless transmission circuit 12 and the wireless reception circuit 15. This causes the wireless transmission circuit 12 and the wireless reception circuit 15 to operate selectively in one of the multiple bands. The wireless transmission circuit 12 and the wireless reception circuit 15 are examples of first wireless communication circuitry. The control circuit 10 sets the band and the communication channel in which the wireless transmission circuit 12 and the wireless reception circuit 15 operate. The timer 18 generates a timer value and sends it to the control circuit 10. The channel table memory 19 stores one of available channels found by the control circuit 10 in each of the multiple bands as the communication channel for that band. The control circuit 10 switches the band in which the wireless transmission circuit 12 and the wireless reception circuit 15 operate in a predetermined order (hereinafter referred to as a first order) such that the wireless transmission circuit 12 and wireless reception circuit 15 operate in all of the multiple bands within a predetermined cycle.

The wireless communication device 2-1 includes a control circuit 20, a modulation circuit 21, a wireless transmission circuit 22, a transmit antenna 23, a receive antenna 24, a wireless reception circuit 25, a demodulation circuit 26, an oscillation circuit 27, a timer 28, an RSSI detection circuit 29, a random number generator 30, an order decision circuit 31, a band table memory 32, and a channel table memory 33. The control circuit 20 is an example of second control circuitry. The control circuit 20 inputs a data signal from an external circuit, and transmits the input data signal via the modulation circuit 21, the wireless transmission circuit 22, and the transmit antenna 23. The control circuit 20 receives a data signal via the receive antenna 24, the wireless reception circuit 25, and the demodulation circuit 26, and outputs the received data signal to the external circuit. The external circuit is a circuit included in a remote unit for driving a monitoring camera, for example.

The oscillation circuit 27, under control of the control circuit 20, supplies a carrier wave signal of a variable frequency to the wireless transmission circuit 22 and the wireless reception circuit 25. This causes the wireless transmission circuit 22 and the wireless reception circuit 25 to operate selectively in one of the multiple bands. The circuit including the wireless transmission circuit 22 and the wireless reception circuit 25 is an example of second wireless communication circuitry. The control circuit 20 sets the band and the communication channel in which the wireless transmission circuit 22 and the wireless reception circuit 25 operate. The timer 28 generates a timer value and sends it to the control circuit 20. The RSSI detection circuit 29 is an example of signal level detection circuitry. The RSSI detection circuit 29 detects the RSSI or other kind of signal level of a signal received by the wireless communication device 2-1 and sends the detection result to the control circuit 20.

The random number generator 30 generates random numbers. The order decision circuit 31 determines the order in which the multiple bands are switched in sequence (hereinafter referred to as a second order) based on random numbers generated by the random number generator 30. The band table memory 32 stores the second order determined by the order decision circuit 31. The band table memory 32 also stores an RSSI threshold and an operable distance for each of the bands. The channel table memory 33 stores channels of certain bands which have been found by the wireless communication device 2-1 and in which the wireless communication device 1 operates as well as channels of the respective bands indicated by the wireless communication device 1. The control circuit 20 switches the band in which the wireless transmission circuit 22 and the wireless reception circuit 25 operate to the next band in accordance with the second order when the wireless transmission circuit 22 and the wireless reception circuit 25 have been unable to communicate with the wireless communication device 1 for a predetermined time which is longer than or equal to the cycle time in which the wireless communication device 1 switches between all the bands.

FIG. 2 is a block diagram illustrating the configuration of the wireless reception circuit 25 of FIG. 1. The wireless reception circuit 25 includes multiple circuit components for processing received signals. The wireless reception circuit 25 includes a low-noise amplifier 41, a mixer 42, a bandpass filter (denoted as BPF in FIG. 2) 43, a gain control amplifier 44, and an analog-digital converter (hereinafter referred to as A/D converter and denoted as ADC in FIG. 2) 45, for example.

FIG. 3 is a block diagram illustrating the configuration of the random number generator 30 in FIG. 1. The random number generator 30 includes a memory 51, a configuration circuit 52, an XOR gate 53, and flip-flop circuits FF1 through FFn. The memory 51 stores the initial value of the random number generator 30, and the configuration circuit 52 sets the initial value of the random number generator 30 in each of the flip-flop circuits FF1 through FFn.

As mentioned earlier, the order decision circuit 31 determines the order of sequentially switching the multiple bands (that is, the second order) based on random numbers generated by the random number generator 30. For example, when determining the switching order of five bands A to E, the order decision circuit 31 takes 3-bit random numbers 1 through 7 from the random number generator 30, and maps numbers 1 to 5 obtained from the random number generator 30 to the five bands A to E respectively, thereby determining the order in which the bands A to E are switched. Specifically, the order decision circuit 31 obtains a 3-bit random number 1 through 7 from the random number generator 30 seven times (for example, 3, 2, 7, 4, 1, 5, 6), ignores "6" and "7" obtained from the random number generator 30, and defines the order in which the numbers 1 through 5 were obtained from the random number generator 30 (3, 2, 4, 1, 5) as the order of switching the bands A to E. The bands A to E will accordingly be switched in the order of C→B→D→A→E→C→ . . . . The order decision circuit 31 stores the determined second order in the band table memory 32.

FIG. 4 is a table showing the contents of the band table memory 32 in FIG. 1. The band table memory 32 stores an RSSI threshold and an operable distance for each of the bands A to E. These values are measured in advance. The RSSI threshold is used for changing the order of switching the band in which the wireless transmission circuit 22 and the wireless reception circuit 25 operate. This switching will be discussed later. The RSSI threshold is not changed dynamically. The RSSI thresholds for the bands A to E may be the same value. The bands A to E also have predetermined operable distances d1 to d5. The operable distance depends on frequency, transmission power, and reception sensitivity. The band table memory 32 further stores the order determined by the order decision circuit 31 (that is, the second order).

Next, referring to FIGS. 5 through 7, the operation of the wireless communications system shown in FIG. 1 will be described.

Figure 5:
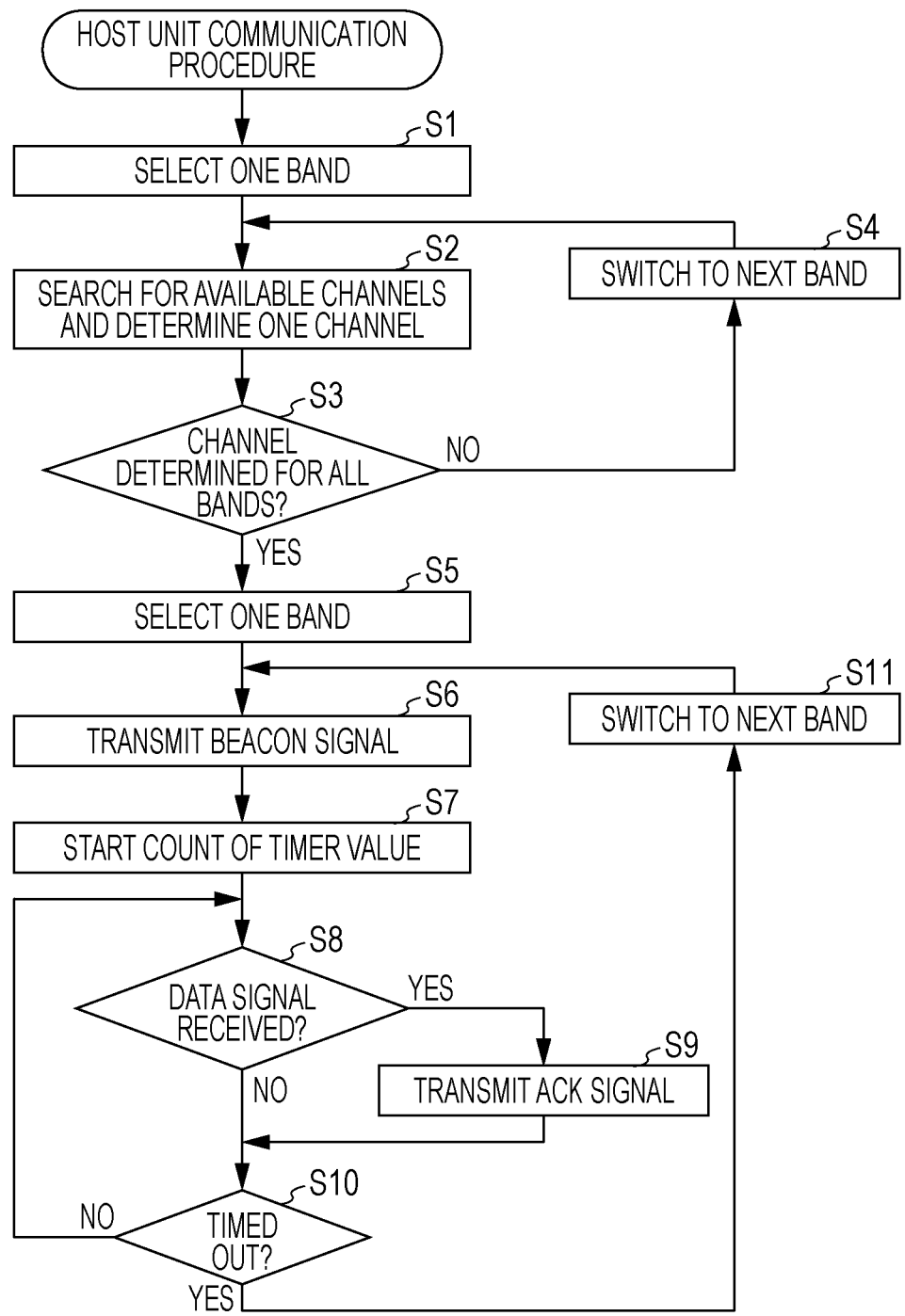
FIG. 5 is a flowchart illustrating the host unit communication procedure performed by a control circuit 10 of a wireless communication device 1 shown in FIG. 1.

FIG. 5 is a flowchart illustrating the host unit communication procedure performed by the control circuit 10 of the wireless communication device 1 shown in FIG. 1.

At steps S1 through S4 in FIG. 5, the control circuit 10 uses the wireless transmission circuit 12 and the wireless reception circuit 15 to search for available channels on each of the multiple bands, and sets one of available channels on the band as the communication channel for that band. At step S1, the control circuit 10 selects a band and sets it in the wireless transmission circuit 12 and the wireless reception circuit 15. At step S2, the control circuit 10 uses the wireless transmission circuit 12 and the wireless reception circuit 15 to search for available channels by carrier sense to determine one channel. At step S3, the control circuit 10 decides whether or not the channel has been determined for all of the bands. If YES, the control circuit 10 proceeds to step S5; if NO, the control circuit 10 proceeds to step S4. At step S4, the control circuit 10 switches the band in which the wireless transmission circuit 12 and the wireless reception circuit 15 operate to the next band and returns to step S2. The control circuit 10 repeats step S2 through S4 for each band.

At step S5 through S11 in FIG. 5, the control circuit 10 communicates with the wireless communication device of each remote unit (such as the wireless communication device 2-1). At step S5, the control circuit 10 selects a band and sets it in the wireless transmission circuit 12 and the wireless reception circuit 15. At step S6, the control circuit 10 uses the wireless transmission circuit 12 and the wireless reception circuit 15 to transmit a beacon signal. The control circuit 10 notifies the wireless communication device of the remote unit about the communication channels each determined for the corresponding band at step S1 through S4 using the wireless transmission circuit 12 and the wireless reception circuit 15 when the wireless communication device 1 has established a communication with the wireless communication device of the remote unit. For instance, when the beacon signal or other kind of signal has reached the wireless communication device of a remote unit, the wireless communication device of the remote unit is notified of the communication channels each determined for the corresponding band at steps S1 through S4.

At step S7, the control circuit 10 starts the count of the timer value. At step S8, the control circuit 10 decides whether a data signal has been received from the wireless communication device of a remote unit or not. If YES, the control circuit 10 proceeds to step S9; if NO, the control circuit 10 proceeds to step S10. At step S9, the control circuit 10 uses the wireless transmission circuit 12 and the wireless reception circuit 15 to transmit an ACK signal to the wireless communication device of the remote unit from which the data signal was sent. At step S10, the control circuit 10 decides whether or not a predetermined timeout period has elapsed since the count of the timer value started at step S7. If YES, the control circuit 10 proceeds to step S11; if NO, the control circuit 10 returns to step S8. At step S11, the control circuit 10 switches the band in which the wireless transmission circuit 12 and the wireless reception circuit 15 operate to the next band in the predetermined order (the first order) and returns to step S6.

Figure 6:
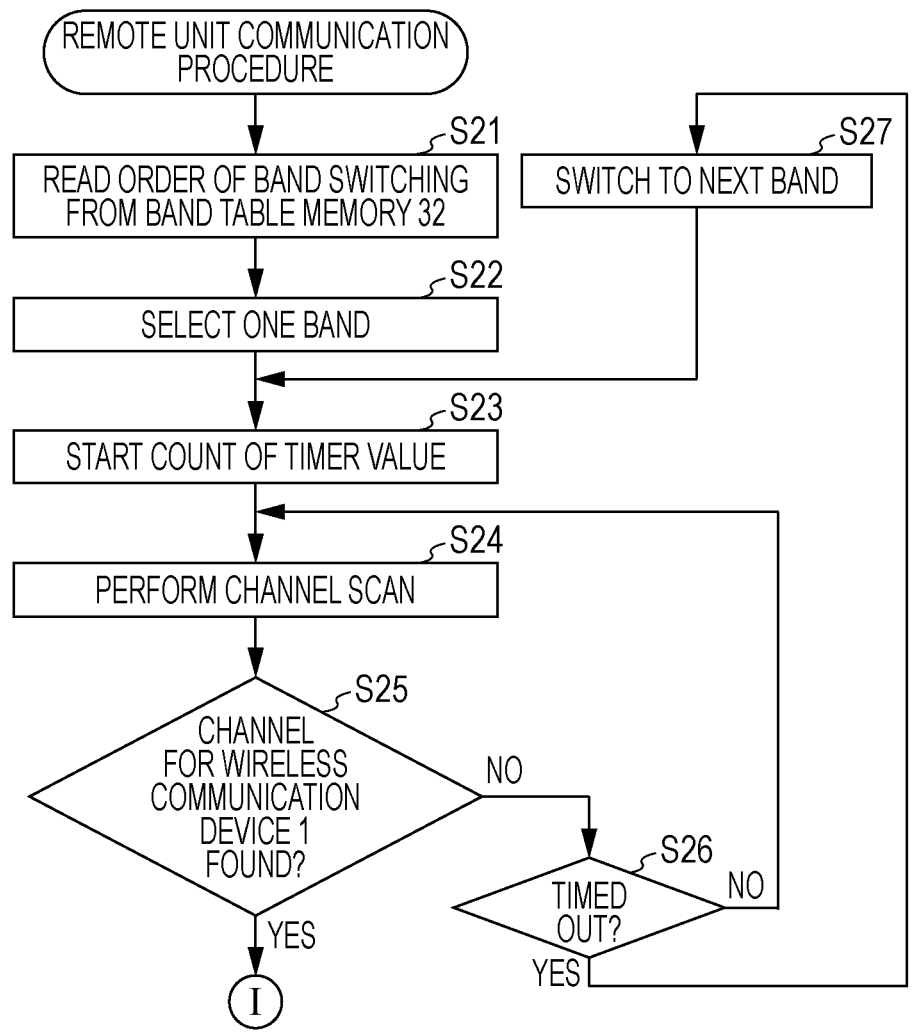
FIG. 6 is a flowchart illustrating a first part of the remote unit communication procedure performed by a control circuit 20 of a wireless communication device 2-1 in FIG. 1.

FIG. 6 is a flowchart illustrating a first part of the remote unit communication procedure performed by the control circuit 20 of the wireless communication device 2-1 in FIG. 1. FIG. 7 is a flowchart illustrating a second part of the remote unit communication procedure performed by the control circuit 20 of the wireless communication device 2-1 in FIG. 1.

At step S21 through S27 in FIG. 6, once the control circuit 20 has set a band in the wireless transmission circuit 22 and the wireless reception circuit 25, it uses the wireless transmission circuit 22 and the wireless reception circuit 25 to search for the communication channel for that band. At step S21, the control circuit 20 reads the order of sequentially switching the bands (that is, the second order) from the band table memory 32. At step S22, the control circuit 20 selects a band in accordance with the second order and sets it in the wireless transmission circuit 22 and the wireless reception circuit 25. At step S23, the control circuit 20 starts the count of the timer value. At step S24, the control circuit 20 uses the wireless transmission circuit 22 and the wireless reception circuit 25 to perform channel scan. At step S25, the control circuit 20 decides whether a channel for the wireless communication device 1 has been found or not. If YES, the control circuit 20 proceeds to step S28 in FIG. 7; if NO, the control circuit 20 proceeds to step S26. The control circuit 20 further stores, in the channel table memory 33, information on the channel for the wireless communication device 1 that has been found.

At step S26, the control circuit 20 decides whether or not a predetermined timeout period has elapsed since the count of the timer value started at step S23. If YES, the control circuit 20 proceeds to step S27; if NO, the control circuit 20 returns to step S24. The predetermined time at step S26 may be set to the cycle time in which the wireless communication device 1 switches between all the bands, for example. At step S27, the control circuit 20 switches the band in which the wireless transmission circuit 22 and the wireless reception circuit 25 operate to the next band in accordance with the second order and returns to step S22. The control circuit 20 repeats step S24 through S27 until a channel is found on any of the bands. If no channel has been found in all of the bands, the control circuit 20 returns to the first band it searched and repeats step S24 through S27.

Figure 7:
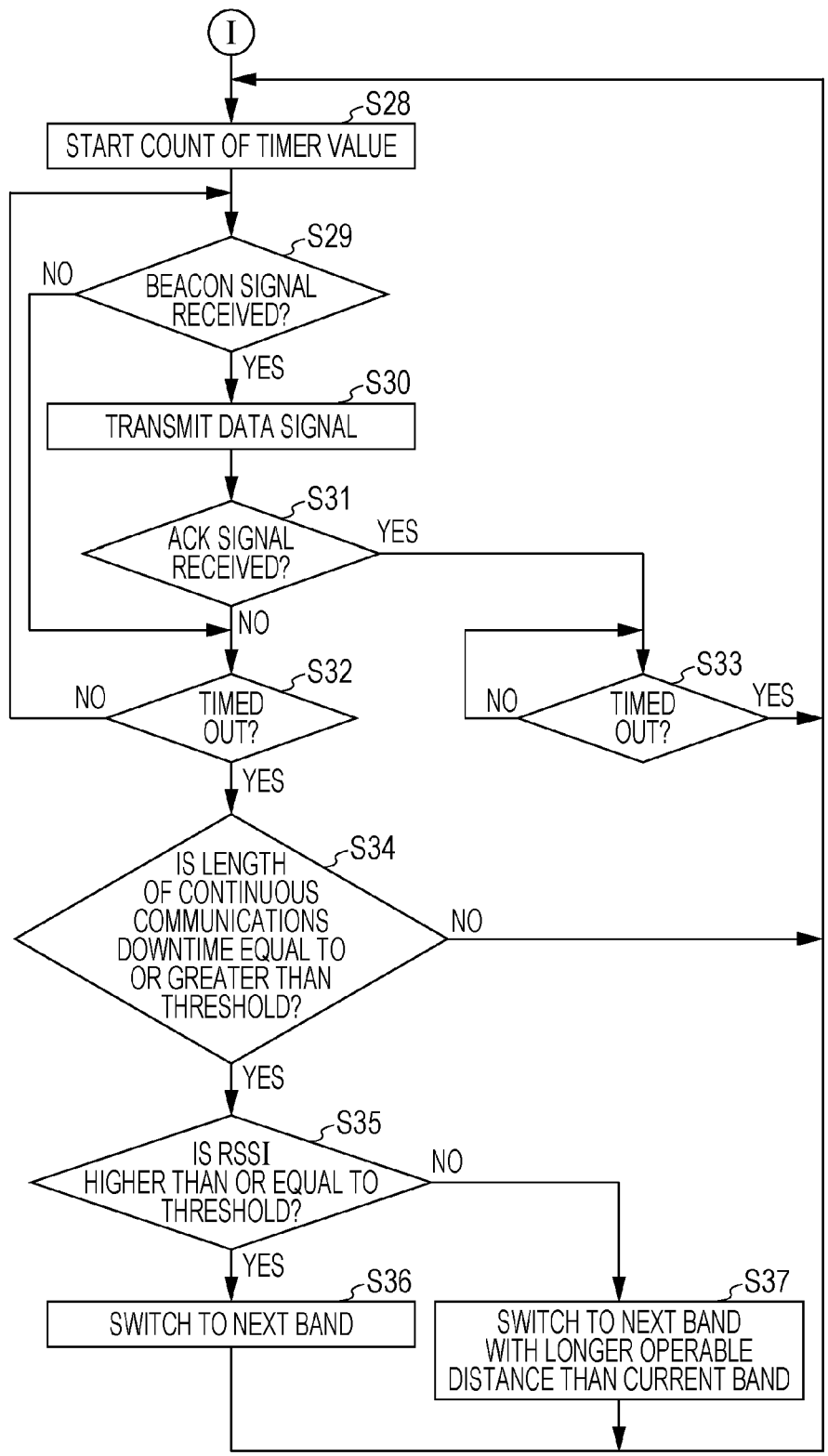
FIG. 7 is a flowchart illustrating a second part of the remote unit communication procedure performed by the control circuit 20 of the wireless communication device 2-1 in FIG. 1.

At step S28 through S37 in FIG. 7, the control circuit 20 communicates with the wireless communication device 1 of the host unit. The control circuit 20 starts communication with the wireless communication device 1 of the host unit using the channel found in step S21 through S27 and the band including that channel. At step S28, the control circuit 20 starts the count of the timer value. At step S29, the control circuit 20 decides whether or not a beacon signal has been received from the wireless communication device 1 of the host unit. If YES, the control circuit 20 proceeds to step S30; if NO, the control circuit 20 proceeds to step S32. The wireless communication device 2-1 of the remote unit and the wireless communication devices of other remote units synchronize with the wireless communication device 1 of the host unit by receiving a beacon signal. When the wireless communication device 2-1 has established a communication with the wireless communication device 1 of the host unit, the control circuit 20 obtains information on the communication channel for each band from the wireless communication device 1 of the host unit using the wireless transmission circuit 22 and the wireless reception circuit 25.

For example, when a beacon signal or other kind of signal has reached the wireless communication device 2-1, the wireless communication device 2-1 is notified of the communication channels each determined for the corresponding band in steps S1 through S4. The control circuit 20 also stores information on the communication channels each obtained for the corresponding band from the wireless communication device 1 of the host unit in the channel table memory 33. At step S30, the control circuit 20 uses the wireless transmission circuit 22 and the wireless reception circuit 25 to transmit a data signal to the wireless communication device 1 of the host unit. At step S31, the control circuit 20 decides whether an ACK signal has been received from the wireless communication device 1 of the host unit or not. If YES, the control circuit 20 proceeds to step S33; if NO, the control circuit 20 proceeds to step S32. At step S32, the control circuit 20 decides whether or not a predetermined timeout period has elapsed since the count of the timer value started at step S28. If YES, the control circuit 20 proceeds to step S34; if NO, the control circuit 20 returns to step S29. At step S33, the control circuit 20 decides whether a predetermined timeout period has elapsed since the count of the timer value started at step S28 or not. If YES, the control circuit 20 returns to step S28; if NO, the control circuit 20 repeats step S33. The predetermined time at steps S32 and S33 may be set to an amount of time equal to or longer than the cycle time in which the wireless communication device 1 switches between all the bands, for example.

If the decision at step S32 results in YES (that is, if the wireless communication device 2-1 has been unable to communicate with the wireless communication device 1 of the host unit for the predetermined time equal to or longer than the cycle time in which the wireless communication device 1 switches between all the bands), then at step S34 the control circuit 20 decides whether or not the length of a continuous communications downtime is equal to or greater than a threshold. If YES at step S34, the control circuit 20 proceeds to step S35; if NO, the control circuit 20 returns to step S28. The length of the continuous communications downtime is the number of time periods in which the wireless communication device 2-1 was not able to communicate with the wireless communication device 1, counted in units of the cycle time in which the wireless communication device 1 switches between all of the bands, for example. The threshold at step S34 is provided for the purpose of preventing an easy switching of bands when communication becomes unavailable due to transient noise. A tradeoff here is that the resistance against noise increases as a longer threshold is used at step S34, but the time during which communication is unavailable becomes longer as the band is not switched when it should be actually switched.

At step S35, the control circuit 20 decides whether the current RSSI is higher than or equal to the predetermined threshold (FIG. 4) or not. If YES, the control circuit 20 proceeds to step S36; if NO, the control circuit 20 proceeds to step S37. At step S36, the control circuit 20 switches the band in which the wireless transmission circuit 22 and the wireless reception circuit 25 operate to the next band in accordance with the second order. At step S37, the control circuit 20 switches the band in which the wireless transmission circuit 22 and the wireless reception circuit 25 operate to the next band that has a longer operable distance than the current band in accordance with the second order. There can be two causes of unavailability of communication: insufficient sensitivity and excessive traffic. In the case of insufficient sensitivity (that is, when the RSSI is below the threshold), there is no point in switching to a band with a shorter operable distance than the current band, so the band is switched as described at step S37. As an example, supposing that bands A to E are switched in the order of C→B→D→A→E→C→ . . . and the operable distances d1 to d5 of the bands A to E are d1>d2>d3>d4>d5 as illustrated in FIG. 4, if communication becomes unavailable due to insufficient sensitivity during communication on band B, the next band D would not be used because its operable distance is shorter than the band B, and the further next band A would be selected.

When switching the band at steps S36 and S37, the control circuit 20 uses information on the communication channel for each band which has been acquired from the wireless communication device 1 of the host unit and stored in the channel table memory 33.

Figure 8:
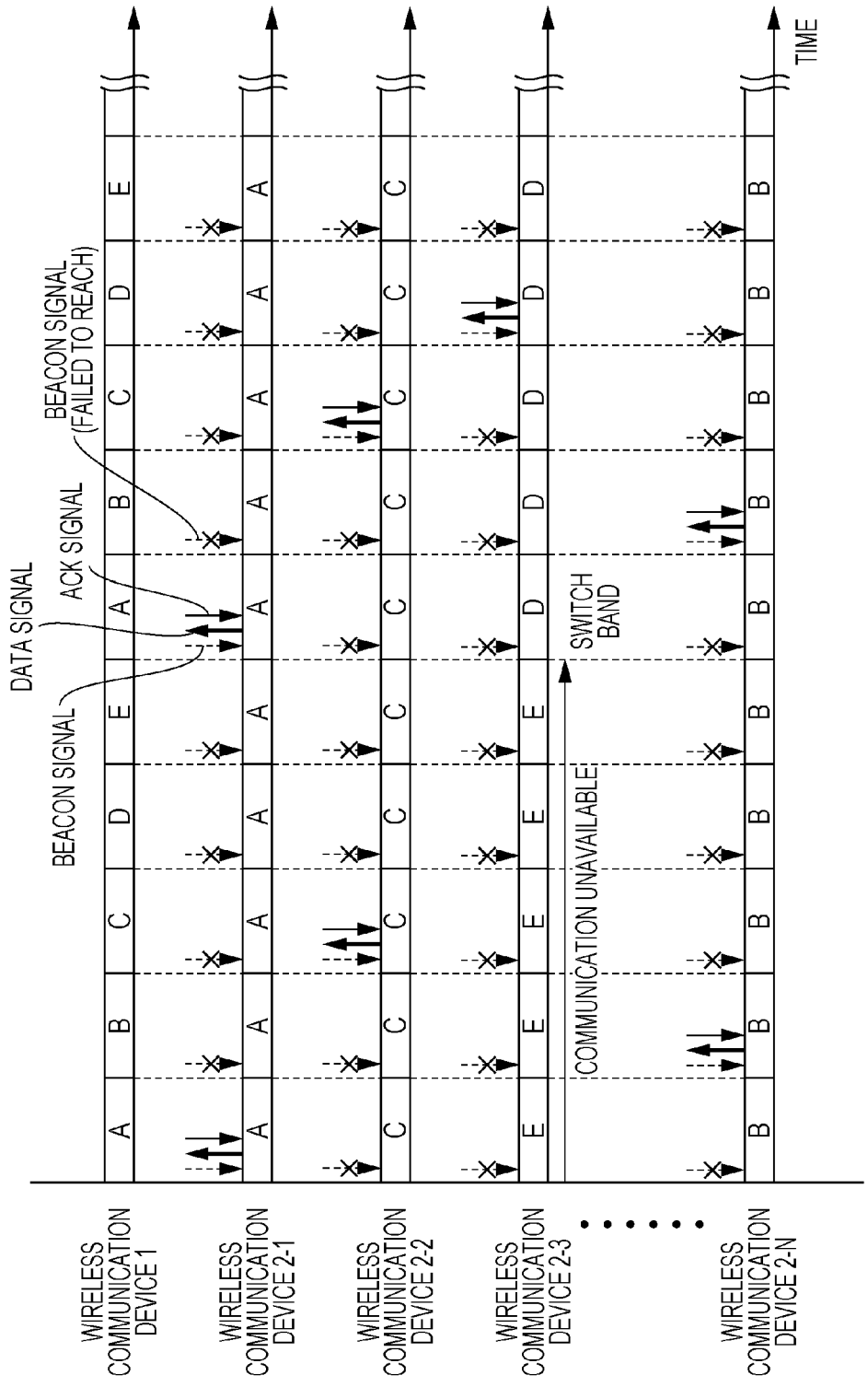
FIG. 8 is a timing diagram illustrating a first exemplary operation of the wireless communications system in FIG. 1.

FIG. 8 is a timing diagram illustrating a first exemplary operation of the wireless communications system in FIG. 1. Dotted lines represent a beacon signal from the wireless communication device 1 of the host unit to the wireless communication devices 2-1 to 2-N of remote units, bold solid lines represent a data signal from the wireless communication devices 2-1 to 2-N of remote units to the wireless communication device 1 of the host unit, and thin solid lines represent an ACK signal from the wireless communication device 1 of the host unit to the wireless communication devices 2-1 to 2-N of remote units.

When each of the wireless communication devices 2-1 to 2-N of remote units operates in the same band as the wireless communication device 1 of the host unit, the wireless communication device of the remote unit receives a beacon signal from the wireless communication device 1 of the host unit, then sends a data signal to the wireless communication device 1 of the host unit, and receives an ACK signal from the wireless communication device 1 of the host unit.

When each of the wireless communication devices 2-1 to 2-N of remote units operates in a different band from the wireless communication device 1 of the host unit, the wireless communication device of the remote unit cannot receive a beacon signal from the wireless communication device 1 of the host unit. Although FIG. 8 shows that the wireless communication device 1 of the host unit switches bands A to E in the order of A→B→C→D→E→A→ . . . (that is, the first order), bands A to E may be switched in any other order. The period of time for which the wireless communication device 1 of the host unit operates in one band is one second as an example, but it may be other length of time. Each of the wireless communication devices 2-1 to 2-N switches bands A to E in an order determined based on generated random numbers (that is, the second order).

The wireless communication device 2-3 of the remote unit switches the band in which the wireless communication device 2-3 operates to, for example, the next band D in accordance with the second order if it is operating in band E and if it has been unable to communicate with the wireless communication device 1 for a predetermined time equal to or longer than the cycle time in which the wireless communication device 1 switches between all the bands. When the wireless communication device 1 of the host unit is subsequently operating in band D, the wireless communication device 2-3 can communicate with the wireless communication device 1.

Figure 9:
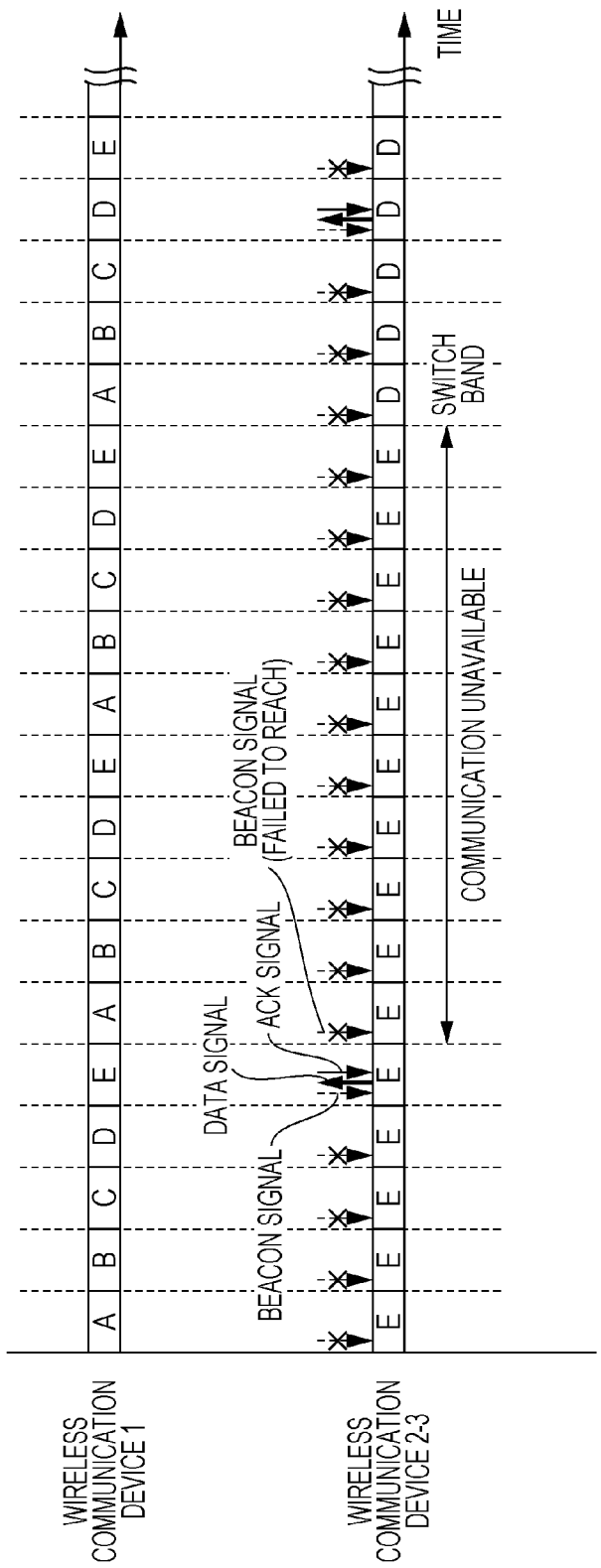
FIG. 9 is a timing diagram illustrating a second exemplary operation of the wireless communications system in FIG. 1.

FIG. 9 is a timing diagram illustrating a second exemplary operation of the wireless communications system in FIG. 1. As described above in relation to step S34 in FIG. 7, in order to prevent an easy switching of bands when communication becomes unavailable due to transient noise, the wireless communication device of a remote unit (for example, wireless communication device 2-3) is allowed to switch the operating band to the next band in accordance with the second order only if the length of the continuous communications downtime is greater than or equal to a threshold. In the example of FIG. 9, when the wireless communication device 2-3 of the remote unit has been unable to communicate with the wireless communication device 1 of the host unit for two cycles, which is counted in units of the cycle time in which the wireless communication device 1 of the host unit switches between all the bands, the wireless communication device 2-3 of the remote unit switches the operating band to, for example, the next band D in accordance with the second order. When the wireless communication device 1 of the host unit is subsequently operating in band D, the wireless communication device 2-3 can communicate with the wireless communication device 1.

Figure 10:
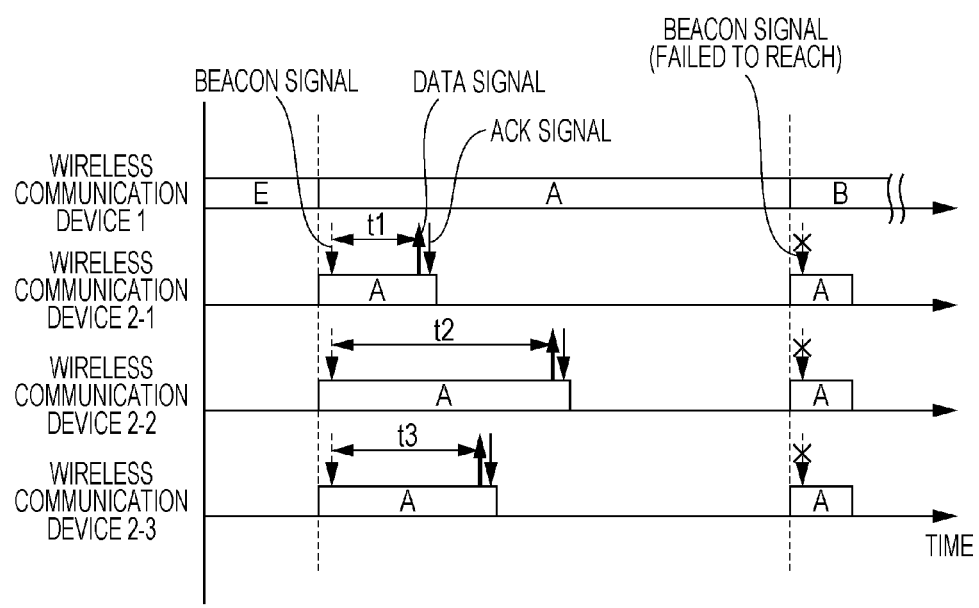
FIG. 10 is a timing diagram illustrating a third exemplary operation of the wireless communications system in FIG. 1.

FIG. 10 is a timing diagram illustrating a third exemplary operation of the wireless communications system in FIG. 1. Since the wireless communication device of a remote unit determines the order of switching the bands A to E (that is, the second order) based on random numbers, the wireless communication devices of multiple remote units (for example, wireless communication devices 2-1 to 2-3) can possibly operate in the same band (for example, band A) concurrently. Thus, a known CSMA/CA technique is employed for preventing a simultaneous transmission by the wireless communication devices of multiple remote units. After receiving a beacon signal from the wireless communication device 1 of the host unit, the wireless communication devices 2-1 to 2-3 of remote units each generate a random number and wait for a back-off time t1 to t3 generated based on the random number, before transmitting a data signal to the wireless communication device 1. The back-off time may be the product of a generated random number and a predetermined slot time, for example. This prevents a simultaneous transmission of data signals by the wireless communication devices 2-1 to 2-3 of multiple remote units even if the wireless communication devices 2-1 to 2-3 of multiple remote units are operating in the same band A concurrently.

For saving power consumption, the wireless communication device of a remote unit may be active only for a part of the time period during which the wireless communication device 1 of the host unit is operating in one band and be inactive (that is, sleep) during the remainder of the time period as illustrated in FIG. 10. When being active, the wireless transmission circuit 22 and the wireless reception circuit 25 in the wireless communication device of the remote unit are turned on. On the other hand, when being inactive, the wireless transmission circuit 22 and the wireless reception circuit 25 in the wireless communication device of the remote unit are turned off for example. Referring to FIG. 10, during a time period in which the wireless communication device 1 of the host unit and the wireless communication devices 2-1 to 2-3 of remote units operate in the same band A, the wireless communication devices 2-1 to 2-3 of remote units become active at the start of the time period. Then, each of the wireless communication devices 2-1 to 2-3 keeps the active state until when communication with the wireless communication device 1 of the host unit ends, and thereafter goes inactive.

During a time period in which the wireless communication device 1 of the host unit and the wireless communication devices 2-1 to 2-3 of the remote units operate in different bands A and B respectively, each of the wireless communication devices 2-1 to 2-3 of the remote units becomes active at the start of the corresponding time period. Then, each of the wireless communication devices 2-1 to 2-3 keeps the active state until when a predetermined time elapses, and then goes inactive. Also in a time period in which the wireless communication device 1 of the host unit and the wireless communication devices 2-1 to 2-3 of remote units operate in the same band, the wireless communication devices 2-1 to 2-3 of the remote units may be active from the start of the time period to when a predetermined time elapses, and then go inactive. Intermittent operation of the wireless communication devices of remote units as depicted in FIG. 10 can save power consumption.

Figure 11:
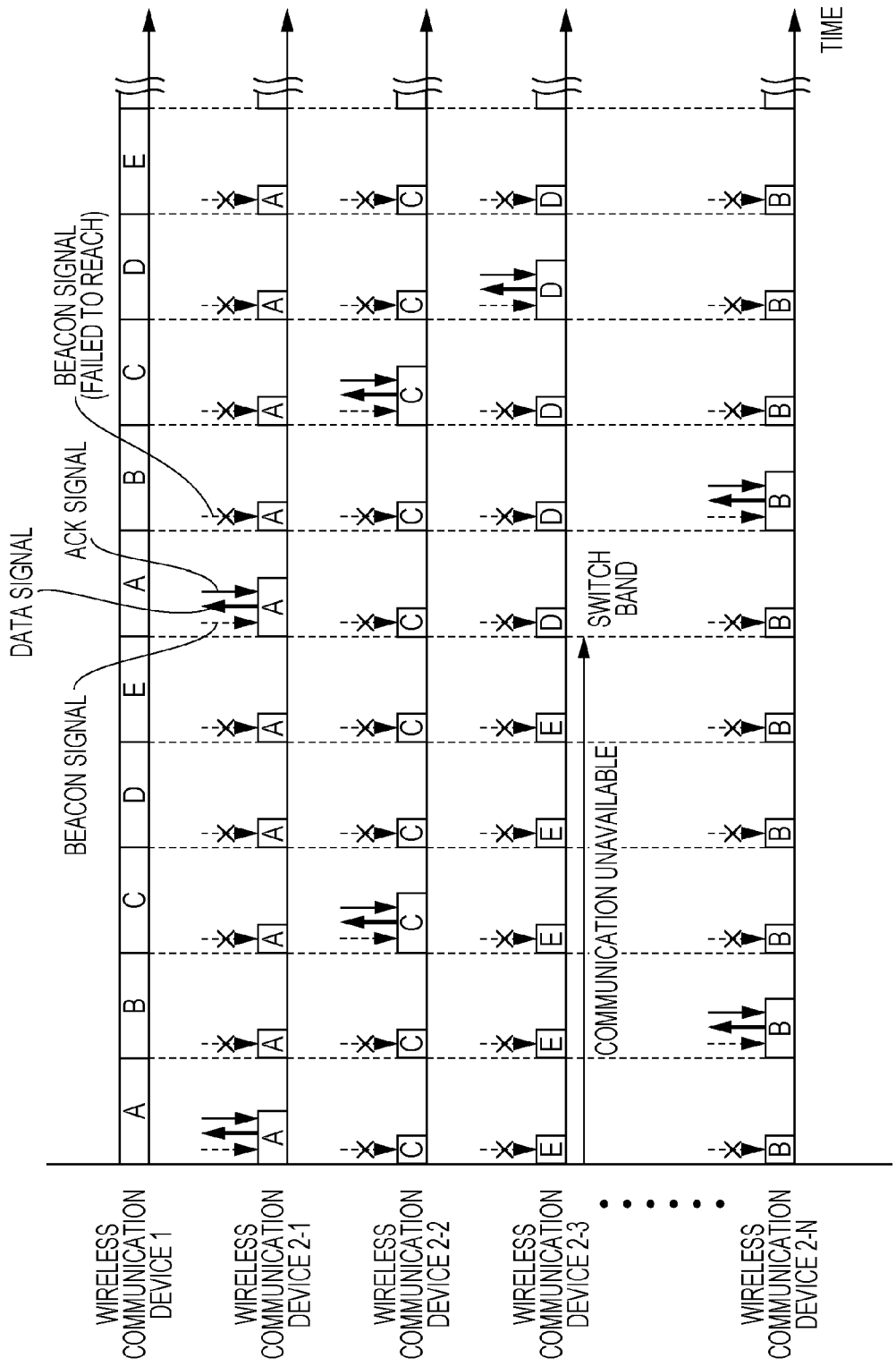
FIG. 11 is a timing diagram illustrating a fourth exemplary operation of the wireless communications system in FIG. 1.

FIG. 11 is a timing diagram illustrating a fourth exemplary operation of the wireless communications system in FIG. 1. FIG. 11 illustrates a case of applying the intermittent operation of the wireless communication devices of remote units described in FIG. 10 to the timing diagram shown in FIG. 8. Intermittent operation of the wireless communication devices 2-1 to 2-N of remote units as shown in FIG. 11 can save power consumption.

Figure 12:
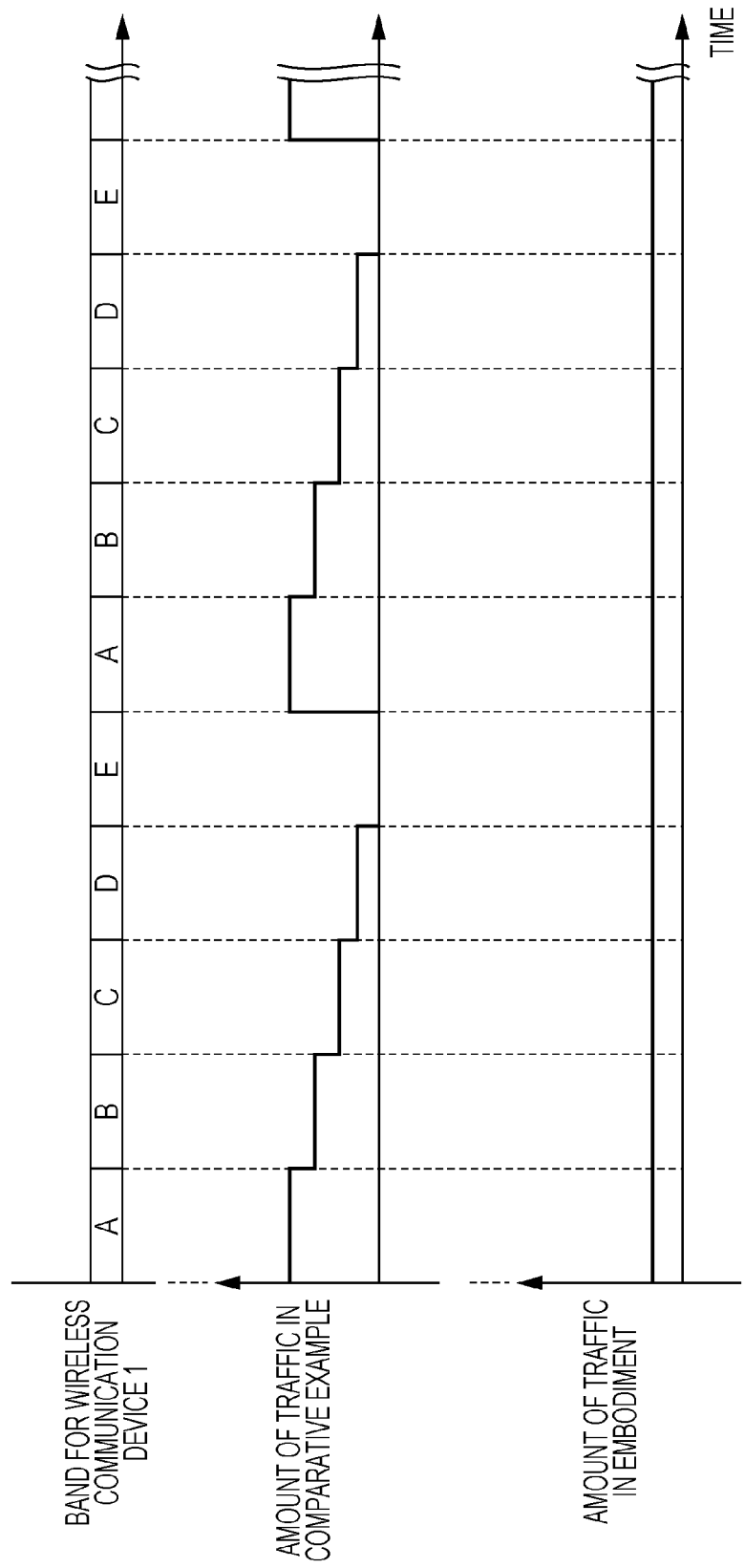
FIG. 12 is a diagram showing an example of efficient use of multiple bands A to E in the wireless communications system in FIG. 1.

FIG. 12 is a diagram showing an example of efficient use of multiple bands A to E in the wireless communications system of FIG. 1. In the comparative example, the wireless communication devices of all remote units start operation in the same band A, and if they cannot communicate with the wireless communication device 1 of the host unit, they switch the band in the same prescribed order. Therefore, the amount of traffic becomes uneven among the bands A to E in the comparative example. In contrast, in the embodiment of the wireless communications system shown in FIG. 1, each of the wireless communication devices of the multiple remote units each starts operation in a certain band in an order determined based on generated random numbers (that is, the second order), and individually switches the bands A to E in that order if they cannot communicate with the wireless communication device 1 of the host unit. Consequently, in the embodiment, the amount of traffic can be evened out among the bands A to E. The second orders of the wireless communication devices may be different from each other.

The wireless communications system of FIG. 1 has such effects as follows.

By having the wireless communication devices of remote units switch the band in accordance with the conditions of communication, the wireless communications system of FIG. 1 can prevent interruptions of communication caused by an increase in traffic.

The wireless communications system of FIG. 1 can evenly and efficiently use multiple bands because the wireless communication device of the host unit switches the band in a predetermined first order and each of the wireless communication devices of remote units switches the band in a second order which is determined based on random numbers.

The wireless communications system of FIG. 1 can prevent increase in extra processing and extra traffic involved in band switching because the wireless communication device of the host unit switches the band in a predetermined first order and each of the wireless communication devices of remote units switches the band in a second order which is determined based on random numbers.

The wireless communications system of FIG. 1 can reduce the power consumption of the wireless communication devices of remote units because they synchronize with the wireless communication device of the host unit through a beacon signal sent from the wireless communication device of the host unit.

The wireless communications system of FIG. 1 can prevent increase in the amount of processing performed by the wireless communication device of the host unit because the wireless communication device of the host unit is not involved in decision of the bands in which the wireless communication devices of remote units operate. The wireless communications system of FIG. 1 still enables the wireless communication device of a remote unit to determine the band for communicating with the wireless communication device of the host unit if the wireless communication device of a remote unit cannot communicate with the wireless communication device of the host unit in advance.

The wireless communications system of FIG. 1 can effectively prevent interruptions of communication because the wireless communication device of a remote unit switches to the next band that has a longer operable distance than that of the current band based on the RSSI.

The wireless communications system of FIG. 1 is applicable to a case in which the wireless communication device of the host unit and the wireless communication devices of remote units use any number of bands.

According to the embodiment described in FIG. 1, a wireless communications system can be provided which can prevent interruptions of communication caused by an increase in traffic, use multiple bands evenly and efficiently, and prevent increase in extra processing and extra traffic involved in band switching.

Second Embodiment

Figure 13:
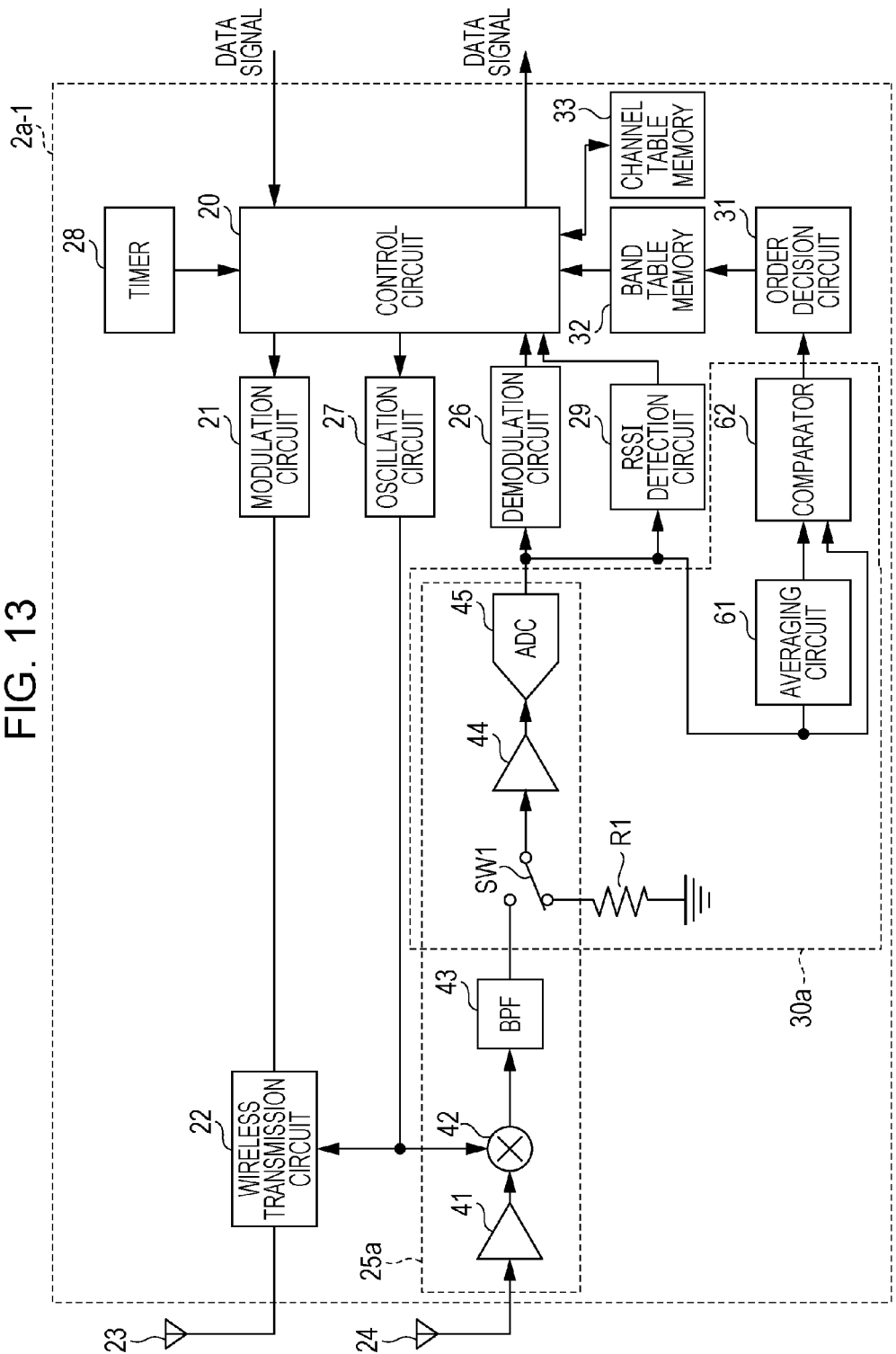
FIG. 13 is a block diagram illustrating the configuration of a wireless communication device 2a-1 in the wireless communications system according to a second embodiment.

The wireless communications system according to a second embodiment has the same structure as or similar structure to that of the wireless communications system in the first embodiment except that wireless communication devices 2a-1 to 2a-N are included in remote units in place of the wireless communication devices 2-1 to 2-N. The wireless communication devices 2a-1 to 2a-N of the remote units have identical or similar configurations to each other. FIG. 13 is a block diagram illustrating the configuration of the wireless communication device 2a-1 in the wireless communications system according to the second embodiment. The wireless communication device 2a-1 includes a control circuit 20, a modulation circuit 21, a wireless transmission circuit 22, a transmit antenna 23, a receive antenna 24, a wireless reception circuit 25a, a demodulation circuit 26, an oscillation circuit 27, a timer 28, an RSSI detection circuit 29, a random number generator 30a, an order decision circuit 31, a band table memory 32, and a channel table memory 33.

The wireless reception circuit 25a and the random number generator 30a share some of their circuit components. The wireless reception circuit 25a has the circuit components shown in FIG. 2. The random number generator 30a includes a noise generator R1, a switch SW1, an averaging circuit 61, and a comparator 62. The random number generator 30a shares a gain control amplifier 44 and an A/D converter 45 with the wireless reception circuit 25a. The random number generator 30a is a physical random number generating circuit that utilizes thermal noise. The noise generator R1 generates noise signals utilizing thermal noise. The switch SW1 selects one from the group consisting of a received signal received by the wireless reception circuit 25a and a noise signal. The switch SW1 inputs the selected signal to at least one first circuit component (for example, the gain control amplifier 44 and the A/D converter 45) of the multiple circuit components in the wireless reception circuit 25a. For example, the switch SW1 is provided between the band-pass filter 43 and the gain control amplifier 44, and selects one from the group consisting of the received signal received by the wireless reception circuit 25a and the noise signal so as to input the selected signal to the gain control amplifier 44.

The gain control amplifier 44 amplifies the received signal or the noise signal. The A/D converter 45 performs A/D conversion of the output signal from the gain control amplifier 44 and sends the output signal to downstream circuits as the output signal of the wireless reception circuit 25a. The averaging circuit 61 averages output signals from the wireless reception circuit 25a over a predetermined period of time so as to generate a threshold for input to the comparator 62. The comparator 62 compares the amplitude of the output signal of the wireless reception circuit 25a with the threshold input from the averaging circuit 61 to thereby generate a random number while the noise signal is input to the first circuit components of the wireless reception circuit 25a by the switch SW1.

The other circuit components of the wireless communication device 2a-1 are the same as or similar to the corresponding circuit components of the wireless communication device 2-1 in FIG. 1 and operate in the same or a similar manner.

The first circuit components of the wireless communication device 2a-1 may include additional circuit components other than the gain control amplifier 44 and the A/D converter 45.

By the wireless reception circuit 25a and the random number generator 30a sharing some of their circuit components, the wireless communication device 2a-1 of FIG. 13 can allow reduction of the circuitry scale and improve the accuracy of random numbers.

Third Embodiment

Figure 14:
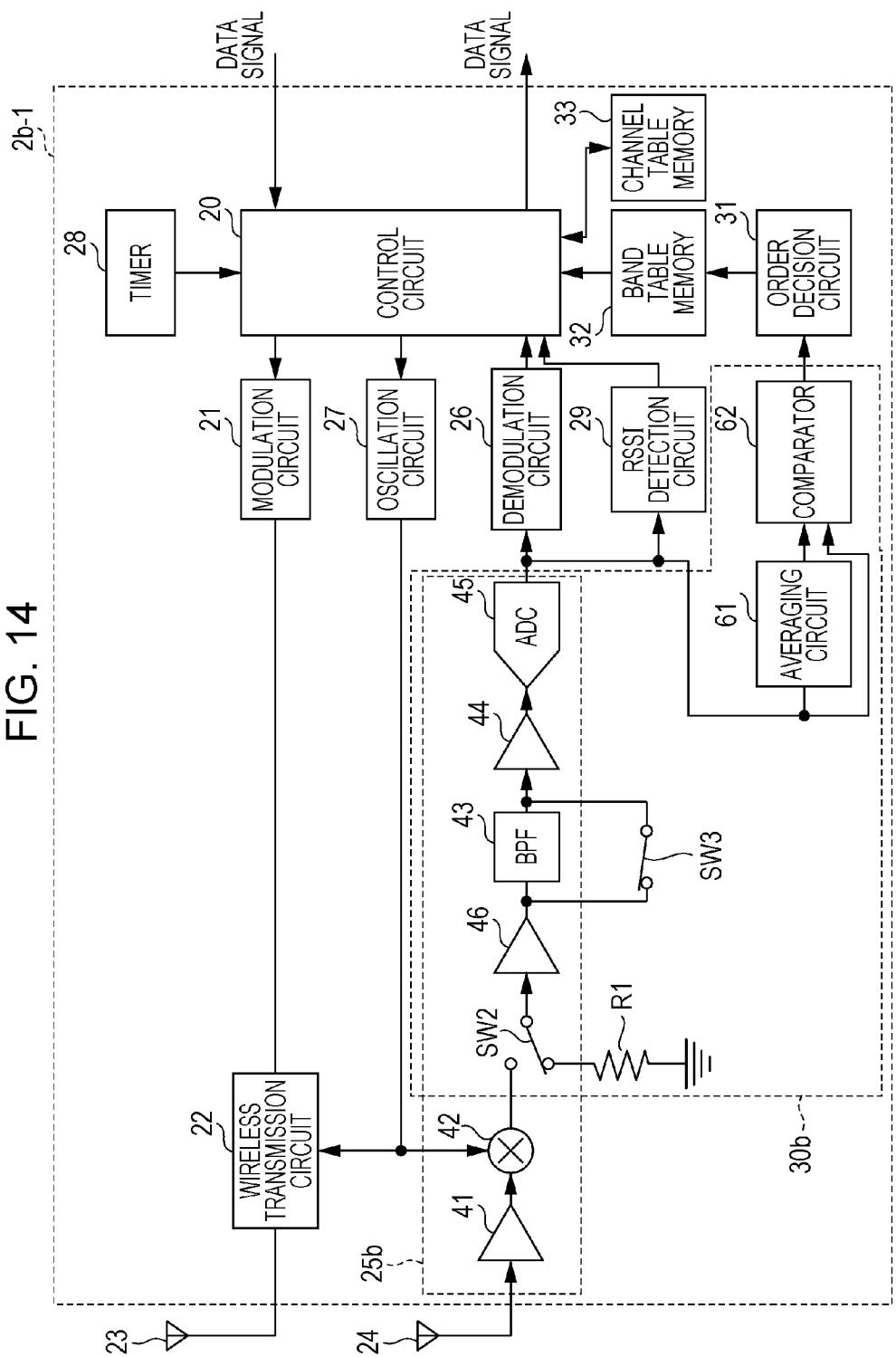
FIG. 14 is a block diagram illustrating the configuration of a wireless communication device 2b-1 in the wireless communications system according to a third embodiment.

The wireless communications system according to a third embodiment has the same structure as or similar structure to that of the wireless communications system in the first embodiment except that wireless communication devices 2b-1 to 2b-N are included in remote units in place of the wireless communication devices 2-1 to 2-N. The wireless communication devices 2b-1 to 2b-N of the remote units have identical or similar configurations to each other. FIG. 14 is a block diagram illustrating the configuration of the wireless communication device 2b-1 in the wireless communications system according to the third embodiment. The wireless communication device 2b-1 includes a control circuit 20, a modulation circuit 21, a wireless transmission circuit 22, a transmit antenna 23, a receive antenna 24, a wireless reception circuit 25b, a demodulation circuit 26, an oscillation circuit 27, timer 28, an RSSI detection circuit 29, a random number generator 30b, an order decision circuit 31, a band table memory 32, and a channel table memory 33.

The wireless reception circuit 25b and the random number generator 30b share some of their circuit components. The wireless reception circuit 25b includes a gain control amplifier 46 between the mixer 42 and the band-pass filter 43 in addition to the circuit components shown in FIG. 2. The random number generator 30b includes a noise generator R1, switches SW2 and SW3, an averaging circuit 61, and a comparator 62. The random number generator 30b shares the gain control amplifiers 46 and 44, and the A/D converter 45 with the wireless reception circuit 25b. The switch SW2 selects one from the group consisting of a received signal received by the wireless reception circuit 25b and a noise signal. The switch SW2 inputs the selected signal to at least one first circuit component (for example, the gain control amplifier 46, the band-pass filter 43, the gain control amplifier 44, and the A/D converter 45) of the multiple circuit components in the wireless reception circuit 25b. For example, the switch SW2 is provided between the mixer 42 and the gain control amplifier 46, and selects one from the group consisting of the received signal received by the wireless reception circuit 25b and the noise signal so as to input to the gain control amplifier 46. The switch SW3 bypasses at least one second circuit component (for example, the band-pass filter 43) included in the first circuit component while the noise signal is input to the first circuit component of the wireless reception circuit 25b by the switch SW2.

The random number generator 30b may also include two or more switches which bypass at least one circuit component that is connected downstream of a circuit component while the noise signal is being input to that circuit component by the switch SW2.

The first circuit components of the wireless communication device 2b-1 may include circuit components other than the gain control amplifier 46, the band-pass filter 43, the gain control amplifier 44, and the A/D converter 45. The second circuit components of the wireless communication device 2b-1 may include circuit components other than the band-pass filter 43.

By the wireless reception circuit 25b and the random number generator 30b sharing some of their circuit components, the wireless communication device 2b-1 of FIG. 14 can allow reduction of the circuitry scale and improve the accuracy of random numbers.

While several illustrative embodiments of the present disclosure have been described, the implementation of the present disclosure is not limited to the embodiments. For example, the wireless communications system may include the single wireless communication device in the single host unit. Alternatively, when there are multiple host units, the wireless communications system may include the wireless communication devices of the multiple host units. Also, instead of switching the band in a single predetermined order, the wireless communication device of the host unit may store predetermined multiple different orders in the storage of the wireless communication device and change the order on a per-cycle basis.

The wireless communication device of a remote unit may use pseudo-random numbers instead of the above-described random numbers. The wireless communication device of a remote unit may store a prescribed order of band switching in the storage of the wireless communication device instead of determining the order of band switching by use of random numbers. In this case, storing of the order of band switching in the storage may be done at the manufacturing factory of the remote unit. The order of band switching to be stored in the storage of the wireless communication devices of remote units may be determined using random numbers or pseudo-random numbers, or may be ones that are not based on random numbers or pseudo-random numbers. When the wireless communications system includes the wireless communication devices of multiple remote units, the orders of band switching that are stored on all or some of the wireless communication devices of the remote units may be different from each other. The wireless communication device of a remote unit may decide whether or not it has been unable to communicate with the host unit for a predetermined period of time either periodically or at a certain timing.

The blocks shown in the description of the embodiments are typically implemented as an integrated circuit (IC). The blocks may be provided as separate chips or a single chip containing all or some of the blocks. Although an IC is taken as an example, the blocks may be implemented as a chip known as LSI, system LSI, super LSI, or ultra LSI depending on the difference in the degree of integration.

The technique for implementing such blocks as an integrated circuit is not limited to dedicated circuitry but the blocks may be implemented as generic programmable circuitry. The blocks may be provided as a field programmable gate array (FPGA) which can be programmed after manufacture, or a reconfigurable processor which allows reconfiguration of the interconnections and settings of circuit cells within an integrated circuit.

Moreover, if a technique that replaces the current integrated circuitry appears by advancement in the semiconductor technology or a derivative different technology, such a technique may naturally be employed for circuit integration. Biotechnology has the potential of being applied to implementation of integrated circuitry and the like.

A wireless communications system according to an embodiment of the present disclosure includes a first wireless communication device and at least one second wireless communication device. The first wireless communication device includes first wireless communication circuitry that selectively operates in one of a plurality of bands, and first control circuitry that sets a band in which the first wireless communication circuitry operates. The first control circuitry switches the band in which the first wireless communication circuitry operates such that the first wireless communication circuitry operates in all of the plurality of bands within a predetermined cycle. The at least one second wireless communication device each includes second wireless communication circuitry that selectively operates in one of the plurality of bands, and second control circuitry that sets a band in which the second wireless communication circuitry operates. In each of the at least one second wireless communication device, the second control circuitry switches the band in which the second wireless communication circuitry operates to a different band when the second wireless communication device has been unable to communicate with the first wireless communication device for a time equal to or longer than the cycle time.

Each of the plurality of bands may have a predetermined operable distance. Each of the at least one second wireless communication device may further include signal level detection circuitry that detects a signal level of a signal received by the second wireless communication circuitry. In each of the at least one second wireless communication device, the second control circuitry may switch the band in which the second wireless communication circuitry operates to a band having a longer operable distance than the operable distance of a current band when the second wireless communication device has been unable to communicate with the first wireless communication device for a time equal to or longer than the cycle time and if the signal level is below a predetermined first threshold.

The first control circuitry may search for available channels in each of the plurality of bands using the first wireless communication circuitry and determine one of available channels found in the band as a communication channel for that band, and set the band and communication channel in which the first wireless communication circuitry operates. When the first wireless communication device has established a communication with the at least one second wireless communication device, the first control circuitry may use the first wireless communication circuitry to notify the at least one second wireless communication device of the communication channel for each of the bands. In each of the at least one second wireless communication device, when a band has been set in the second wireless communication circuitry, the second control circuitry may use the second wireless communication circuitry to search for a communication channel for that band, and acquire information on the communication channel for each of the bands from the first wireless communication device using the second wireless communication circuitry when the second wireless communication device has established a communication with the first wireless communication device. When switching the band in which the second wireless communication circuitry operates, the second control circuitry may set the communication channel on which the second wireless communication circuitry operates on a basis of the information on the communication channel for each of the bands that has been acquired.

The first control circuitry may switch the band in which the first wireless communication circuitry operates in a predetermined first order. The at least one second wireless communication device may each further include a random number generator that generates random numbers or pseudo-random numbers, and in each of the at least one second wireless communication device, the second control circuitry determines a second order of switching the plurality of bands based on the random numbers or pseudo-random numbers. The second control circuitry may switch the band in which the second wireless communication circuitry operates in accordance with the second order.

The at least one second wireless communication device may each include wireless reception circuitry that includes a plurality of circuit components for processing a received signal in the second wireless communication circuitry. The random number generator may include a noise generator that generates a noise signal, a first switch that has one of the received signal and the noise signal be selectively input to at least one first circuit component among the plurality of circuit components, and a comparator that generates a random number by comparing an amplitude of an output signal of the first circuit component with a second threshold while the noise signal is input to the first circuit component by the first switch.

The first circuit component may include an amplifier that amplifies the received signal or the noise signal, and an A/D converter that performs A/D conversion of the output signal of the amplifier.

In the wireless communications system, the random number generator may further include at least one second switch that bypasses at least one second circuit component included in the first circuit component while the noise signal is input to the first circuit component by the first switch.

The second circuit component may include a band-pass filter.

The random number generator may generate the second threshold by averaging output signals from the wireless reception circuitry over a predetermined time.

The at least one second wireless communication device may each further include a storage which stores an order of switching the plurality of bands. In each of the at least one second wireless communication device, the second control circuitry may switch the band in which the second wireless communication circuitry operates in accordance with the order stored in the storage.

The at least one second wireless communication device may include a plurality of second wireless communication devices. The orders stored in the storages of the plurality of second wireless communication devices may be different from each other.

The second control circuitry may switch the band in which the second wireless communication circuitry operates in accordance with random numbers or pseudo-random numbers.

A wireless communication device according to another embodiment of the present disclosure performs wireless communication with at least one remote unit. The wireless communication device includes first wireless communication circuitry that selectively operates in one of a plurality of bands, and first control circuitry that sets a band in which the first wireless communication circuitry operates. The first control circuitry switches the band in which the first wireless communication circuitry operates such that the first wireless communication circuitry operates in all of the plurality of bands within a predetermined cycle. The at least one remote unit each includes second wireless communication circuitry that selectively operates in one of a plurality of bands and second control circuitry that sets a band in which the second wireless communication circuitry operates. In each of the at least one remote unit, the second control circuitry switches the band in which the second wireless communication circuitry operates to a different band when the remote unit has been unable to communicate with the wireless communication device for a time equal to or longer than the cycle time.

A wireless communication device according to another embodiment of the present disclosure performs wireless communication with a host unit. The host unit includes first wireless communication circuitry that selectively operates in one of a plurality of bands, and first control circuitry that sets a band in which the first wireless communication circuitry operates. The first control circuitry switches the band in which the first wireless communication circuitry operates such that the first wireless communication circuitry operates in all of the plurality of bands within a predetermined cycle. The wireless communication device includes second wireless communication circuitry that selectively operates in one of the plurality of bands, and second control circuitry that sets a band in which the second wireless communication circuitry operates. The second control circuitry switches the band in which the second wireless communication circuitry operates to a different band when the wireless communication device has been unable to communicate with the host unit for a time equal to or longer than the cycle time.

The present disclosure is useful as a wireless communications system with low power consumption, for example.

What is claimed is:

1. A wireless communications system comprising:
a first wireless communication device; and
at least one second wireless communication device, wherein
the first wireless communication device includes
first wireless communication circuitry that selectively operates in one of a plurality of bands, and
first control circuitry that sets a band in which the first wireless communication circuitry operates,
the first control circuitry switches the band in which the first wireless communication circuitry operates such that the first wireless communication circuitry operates in all of the plurality of bands within a predetermined cycle time,
the at least one second wireless communication device each includes
second wireless communication circuitry that selectively operates in one of the plurality of bands, and
second control circuitry that sets a band in which the second wireless communication circuitry operates, and
in each of the at least one second wireless communication device, the second control circuitry switches the band in which the second wireless communication circuitry operates to a different band when the second wireless communication device has been unable to communicate with the first wireless communication device for a time equal to or longer than the cycle time.

2. The wireless communications system according to claim 1, wherein:
each of the plurality of bands has a predetermined operable distance,
each of the at least one second wireless communication device further includes signal level detection circuitry that detects a signal level of a signal received by the second wireless communication circuitry, and
in each of the at least one second wireless communication device, the second control circuitry switches the band in which the second wireless communication circuitry operates to a band having a longer operable distance than the operable distance of a current band when the second wireless communication device has been unable to communicate with the first wireless communication device for a time equal to or longer than the cycle time and if the signal level is below a predetermined first threshold.

3. The wireless communications system according to claim 1, wherein:
the first control circuitry
searches for available channels in each of the plurality of bands using the first wireless communication circuitry and determines one of available channels found in the band as a communication channel for that band,
sets the band and communication channel in which the first wireless communication circuitry operates, and
when the first wireless communication device has established a communication with the at least one second wireless communication device, uses the first wireless communication circuitry to notify the at least one second wireless communication device of the communication channel for each of the plurality of bands, and in each of the at least one second wireless communication device, the second control circuitry,
when a band has been set in the second wireless communication circuitry, uses the second wireless communication circuitry to search for a communication channel for that band,
acquires information on the communication channel for each of the bands from the first wireless communication device using the second wireless communication circuitry when the second wireless communication device has established a communication with the first wireless communication device, and
when switching the band in which the second wireless communication circuitry operates, sets the communication channel on which the second wireless communication circuitry operates on a basis of the information on the communication channel for each of the bands that has been acquired.

4. The wireless communications system according to claim 1, wherein:
the first control circuitry switches the band in which the first wireless communication circuitry operates in a predetermined first order,
the at least one second wireless communication device each further includes a random number generator that generates random numbers or pseudo-random numbers, and
in each of the at least one second wireless communication device, the second control circuitry determines a second order of switching the plurality of bands based on the random numbers or pseudo-random numbers, and the second control circuitry switches the band in which the second wireless communication circuitry operates in accordance with the second order.

5. The wireless communications system according to claim 4, wherein:
the at least one second wireless communication device each includes a wireless reception circuitry that includes a plurality of circuit components for processing a received signal in the second wireless communication circuitry, and
the random number generator includes
a noise generator that generates a noise signal,
a first switch that has one of the received signal and the noise signal be selectively input to at least one first circuit component among the plurality of circuit components, and
a comparator that generates a random number by comparing an amplitude of an output signal of the first circuit component with a second threshold while the noise signal is input to the first circuit component by the first switch.

6. The wireless communications system according to claim 5, wherein the first circuit component includes
an amplifier that amplifies the received signal or the noise signal, and
an A/D converter that performs A/D conversion of the output signal of the amplifier.

7. The wireless communications system according to claim 5, wherein the random number generator further includes at least one second switch that bypasses at least one second circuit component included in the first circuit component while the noise signal is input to the first circuit component by the first switch.

8. The wireless communications system according to claim 7, wherein the second circuit component includes a band-pass filter.

9. The wireless communications system according to claim 5, wherein the random number generator generates the second threshold by averaging output signals from the wireless reception circuitry over a predetermined time.

10. The wireless communications system according to claim 1, wherein:
the at least one second wireless communication device each further includes a storage which stores an order of switching the plurality of bands, and
in each of the at least one second wireless communication device, the second control circuitry switches the band in which the second wireless communication circuitry operates in accordance with the order stored in the storage.

11. The wireless communications system according to claim 10, wherein:
the at least one second wireless communication device includes a plurality of second wireless communication devices, and
the orders stored in the storages of the plurality of second wireless communication devices are different from each other.

12. The wireless communications system according to claim 1, wherein the second control circuitry switches the band in which the second wireless communication circuitry operates in accordance with random numbers or pseudo-random numbers.

13. A wireless communication device that performs wireless communication with at least one remote unit, comprising:
first wireless communication circuitry that selectively operates in one of a plurality of bands; and
first control circuitry that sets a band in which the first wireless communication circuitry operates, wherein
the first control circuitry switches the band in which the first wireless communication circuitry operates such that the first wireless communication circuitry operates in all of the plurality of bands within a predetermined cycle time,
the at least one remote unit each includes second wireless communication circuitry that selectively operates in one of a plurality of bands and second control circuitry that sets a band in which the second wireless communication circuitry operates, and
in each of the at least one remote unit, the second control circuitry switches the band in which the second wireless communication circuitry operates to a different band when the remote unit has been unable to communicate with the wireless communication device for a time equal to or longer than the cycle time.

14. A wireless communication device that performs wireless communication with a host unit, wherein:
the host unit includes first wireless communication circuitry that selectively operates in one of a plurality of bands, and first control circuitry that sets a band in which the first wireless communication circuitry operates,
the first control circuitry switches the band in which the first wireless communication circuitry operates such that the first wireless communication circuitry operates in all of the plurality of bands within a predetermined cycle time, the wireless communication device includes second wireless communication circuitry that selectively operates in one of the plurality of bands, and second control circuitry that sets a band in which the second wireless communication circuitry operates, and the second control circuitry switches the band in which the second wireless communication circuitry operates to a different band when the wireless communication device has been unable to communicate with the host unit for a time equal to or longer than the cycle time.

15. The wireless communications system according to claim 1, wherein, during a time period in which the second wireless communication circuitry operates in the different band, the first control circuitry switches, in a determined order, the band in which the first wireless communication circuitry operates.

16. The wireless communication device according to claim 13, wherein, during a time period in which the second wireless communication circuitry operates in the different band, the first control circuitry switches, in a determined order, the band in which the first wireless communication circuitry operates.

17. The wireless communication device according to claim 14, wherein, during a time period in which the second wireless communication circuitry operates in the different band, the first control circuitry switches, in a determined order, the band in which the first wireless communication circuitry operates.

18. The wireless communications system according to claim 1, wherein, during a time period, the different band of the second wireless communication circuity is different than the band in which the first wireless communication circuitry operates.

19. The wireless communication device according to claim 13, wherein, during a time period, the different band of the second wireless communication circuity is different than the band in which the first wireless communication circuitry operates.

20. The wireless communication device according to claim 14, wherein, during a time period, the different band of the second wireless communication circuity is different than the band in which the first wireless communication circuitry operates.

* * * * *